US012607269B2

(12) United States Patent
Ma et al.

(10) Patent No.: US 12,607,269 B2
(45) Date of Patent: Apr. 21, 2026

(54) MULTI-WAY VALVE

(71) Applicant: ZHEJIANG YINLUN MACHINERY CO., LTD., Taizhou (CN)

(72) Inventors: Jun Ma, Taizhou (CN); Kaixing Chen, Taizhou (CN); Junli Lan, Taizhou (CN); Wenxi Wang, Taizhou (CN)

(73) Assignee: ZHEJIANG YINLUN MACHINERY CO., LTD., Taizhou (CN)

( * ) Notice: Subject to any disclaimer, the term of this patent is extended or adjusted under 35 U.S.C. 154(b) by 118 days.

(21) Appl. No.: 18/604,819

(22) Filed: Mar. 14, 2024

(65) Prior Publication Data

US 2024/0218935 A1 Jul. 4, 2024

Related U.S. Application Data

(63) Continuation of application No. PCT/CN2022/126720, filed on Oct. 21, 2022.

(30) Foreign Application Priority Data

Oct. 28, 2021 (CN) .......................... 202111266103.9

(51) Int. Cl.
*F16K 11/072* (2006.01)

(52) U.S. Cl.
CPC .................................. *F16K 11/072* (2013.01)

(58) Field of Classification Search
CPC ........... Y10T 137/86823; F16K 11/072; F16K 11/07; F16K 11/0856; F16K 11/0853; F16K 3/314
See application file for complete search history.

(56) References Cited

U.S. PATENT DOCUMENTS

| | | | | | |
|---|---|---|---|---|---|
| 4,655,252 | A | * | 4/1987 | Krumhansl | ......... F16K 11/0853 251/59 |
| 11,384,852 | B2 | * | 7/2022 | Wang | .................... F16K 31/043 |
| 11,932,078 | B2 | * | 3/2024 | Pinto | .................. B60H 1/00342 |
| 12,345,340 | B2 | * | 7/2025 | Lin | ........................ F16K 31/535 |
| 2009/0320947 | A1 | | 12/2009 | Wan et al. | |
| 2021/0131575 | A1 | * | 5/2021 | Bunda | .................. F16K 5/0471 |

(Continued)

FOREIGN PATENT DOCUMENTS

| | | |
|---|---|---|
| CN | 211525610 U | 9/2020 |
| CN | 112555462 A | 3/2021 |

(Continued)

OTHER PUBLICATIONS

International Search Report of PCT/CN2022/126720, mailed Jan. 12, 2023 .

(Continued)

*Primary Examiner* — Jessica Cahill

(57) ABSTRACT

A multi-way valve is provided. The multi-way valve includes a valve body and a valve core rotatably installed in the valve body. The valve body is provided with nine openings, the valve core is provided with a plurality of channels for matching with the nine openings, and the nine openings are capable of matching with the plurality of channels of the valve core to form four flow passages, the four flow passages of the multi-way valve includes at least five working modes, and the valve core is capable of rotating in the valve body to realize a switching of the multiple working modes.

10 Claims, 7 Drawing Sheets

(56)        References Cited

U.S. PATENT DOCUMENTS

2022/0316607 A1 *  10/2022  Surve ................... F16K 27/065
2023/0304590 A1 *   9/2023  Jönsson .............. F16K 11/0856
2023/0358325 A1 *  11/2023  Chen ................. B60H 1/32284

FOREIGN PATENT DOCUMENTS

| | | | |
|---|---|---|---|
| CN | 113154088 A | 7/2021 | |
| CN | 214222094 U | 9/2021 | |
| CN | 114001175 A | 2/2022 | |
| DE | 102021109742 A1 | 10/2022 | |
| EP | 2050934 A1 | 4/2009 | |
| GB | 698388 A | * 10/1953 | .......... F16K 11/0853 |

OTHER PUBLICATIONS

First notice of examination opinions of 202111266103.9, Dated Jul. 18, 2022.
Notice of first review opinion of DE112022003926.4, May 15, 2025.

* cited by examiner

MULTI-WAY VALVE

CROSS-REFERENCE TO RELATED APPLICATIONS

This application is a continuation of international patent application No. PCT/CN2022/126720, filed on Oct. 21, 2022, which itself claims priority to Chinese patent application Ser. No. 202111266103.9, filed on Oct. 28, 2021, and titled "MULTI-WAY VALVE". The content of the above identified application is hereby incorporated herein in their entireties by reference.

TECHNICAL FIELD

The present disclosure relates to the field of flow control, and in particular, to a multi-way valve.

BACKGROUND

A control valve with multiple channels is usually used to control a cooling circuit in a new energy thermal management system, such as a new electric vehicle (EV), a Plug-in hybrid electric vehicle (PHEV), etc.

At present, an existing new energy thermal management system usually uses a plurality of control valves for control, however, the plurality of the control valves work together to control a fluid control of a plurality of flow paths, and each control valve requires a corresponding installation space, which not only requires a large enough space for installation, but also is inconvenient to install, and will increase a cost of the fluid control.

SUMMARY

According to various embodiments of the present disclosure, a multi-way valve is provided.

A multi-way valve includes a valve body and a valve core rotatably installed in the valve body, the valve body is provided with a plurality of openings, the valve core is provided with a plurality of channels for matching the plurality of openings, and two of the plurality of openings are capable of matching with corresponding one of the plurality of channels to form one flow passage. The number of the plurality of openings is nine, and nine openings are capable of forming four flow passages by matching with the plurality of channels The four flow passages of the multi-way valve includes at least five working modes, and the valve core is capable of rotating in the valve body to realize a switching of the multiple working modes.

In some embodiments, the nine openings are disposed on the valve body in three rows, i.e., a first row of openings, a second row of openings and a third row of openings arranged in sequence, the number of the openings in the first row of openings and the number of the openings in the third row of openings are both four, and the second row of openings are located between the first row of openings and the third row of openings.

In some embodiments, the valve body is further provided with a first connecting convex base, which is located in an area where the nine openings are arranged on the valve body; a side of the first connecting convex base away from the valve body is provided with nine connecting holes, the nine connecting holes are in one-to-one correspondence with the nine openings, and the nine connecting holes are respectively and correspondingly in communication with the nine openings.

In some embodiments, the multi-way valve further includes a sealing member. The sealing member is arranged between the valve body and the valve core and is configured for connecting two of the plurality of openings of the valve body and corresponding one of the plurality of channels of the valve core and sealing a connection part between two of the plurality of openings of the valve body and corresponding one of the plurality of channels of the valve core.

In some embodiments, the sealing member is capable of matching with the valve core to block a remaining one of the plurality of openings of the valve body.

In some embodiments, the sealing member is in an arc structure, and the sealing member is provided with three rows of through holes on the sealing member to match the nine openings, and each of the three rows of through holes comprises four through holes.

In some embodiments, a first convex rib is respectively provided at a peripheral position of each through hole of three rows of through holes and on a side surface of the sealing member towards the valve core, and the first convex rib is capable of being squeezed when the sealing member and the valve core are matched with each other.

In some embodiments, a strip-shaped groove is respectively provided on a side surface of the sealing member away the valve core and located on two opposite edges of each through hole of the three rows of through holes along an axial direction of the valve body, and the sealing member is provided with a second convex rib on another two opposite edges of each of three rows of through holes, the valve body is provided with a protrusion for matching the strip-shaped groove, and the sealing member is capable of being installed on the valve body by cooperation between the protrusion and the strip-shaped groove, and the second convex rib is capable of being squeezed when the sealing member is installed on the valve body.

In some embodiments, the multi-way valve further includes a supporting plate, and the support plate is inserted into the valve body. A surface of the support plate towards the sealing member is provided with an extending convex rib, and the supporting plate is capable of abutting against the valve core through the extending convex rib, to make an axis of the valve core and a rotation axis of the valve core on the same straight line.

In some embodiments, the valve core is provided with a stopping block, the valve body is provided with a matching block for matching the stopping block, and the stopping block is capable of locating an initial position of the valve core on the valve body by cooperating with the matching block.

Details of one or more embodiments of this application are presented in the attached drawings and descriptions below. And other features, purposes and advantages of this application will become apparent from the description, drawings and claims.

BRIEF DESCRIPTION OF THE DRAWINGS

For a better description and illustration of embodiments and/or examples of those disclosures disclosed herein, reference may be made to one or more attached drawings. Additional details or examples used to describe the drawings should not be considered as limiting the scope of any of the disclosed disclosures, currently described embodiments and/or examples, and currently understood best modes of these disclosures.

3

Figure 1:
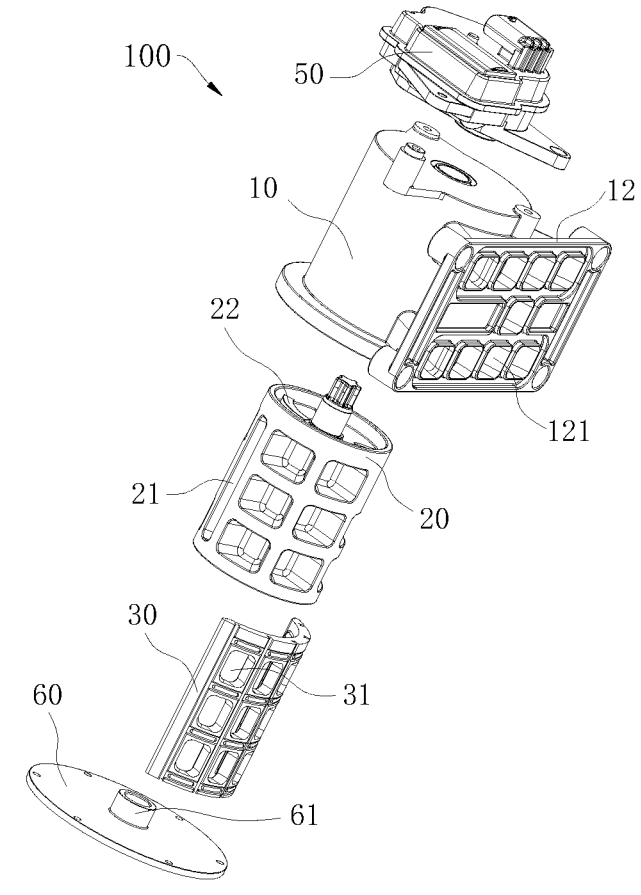
FIG. 1 is an exploded view of a multi-way valve according to one or more embodiments.
Figure 2:
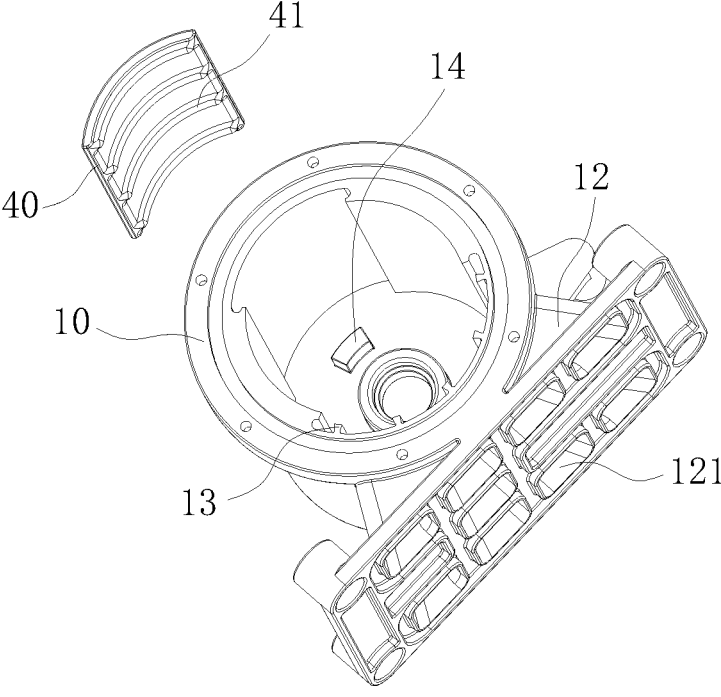

FIG. 2 is an exploded view of a valve body and a supporting plate of a multi-way valve according to one or more embodiments.

Figure 3:
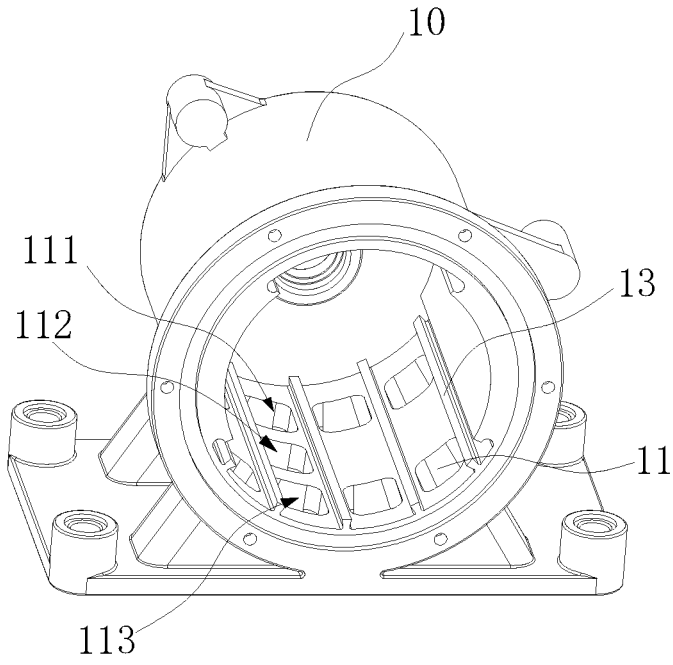

FIG. 3 is a schematic view of a valve body of a multi-way valve according to one or more embodiments.

Figure 4:
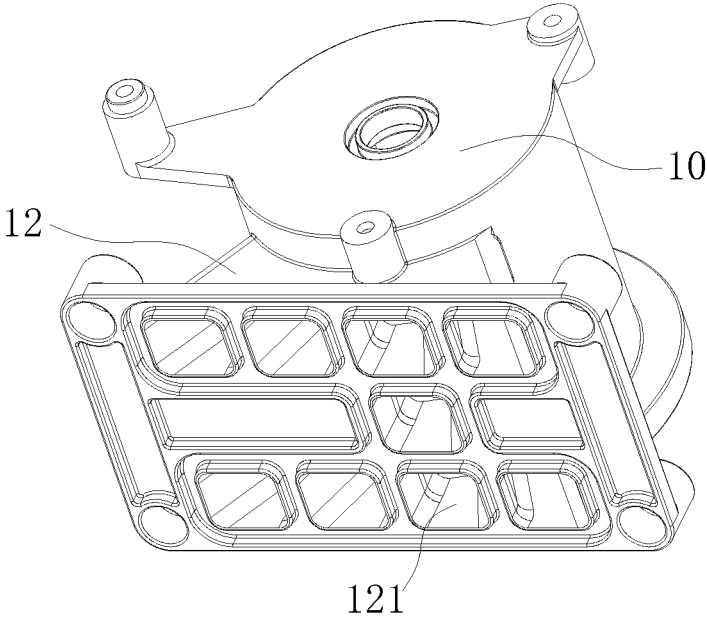

FIG. 4 is a schematic view of a valve body of a multi-way valve in another view angle according to one or more embodiments.

Figure 5:
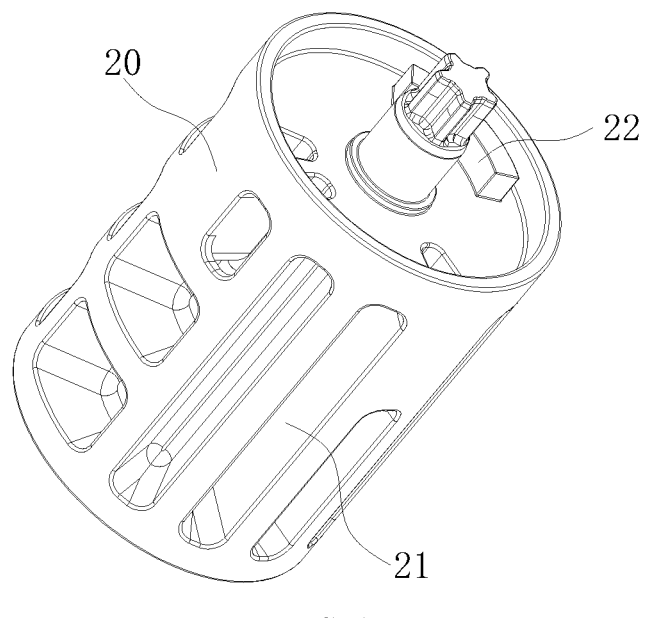

FIG. 5 is a schematic view of a valve core of a multi-way valve according to one or more embodiments.

Figure 6:
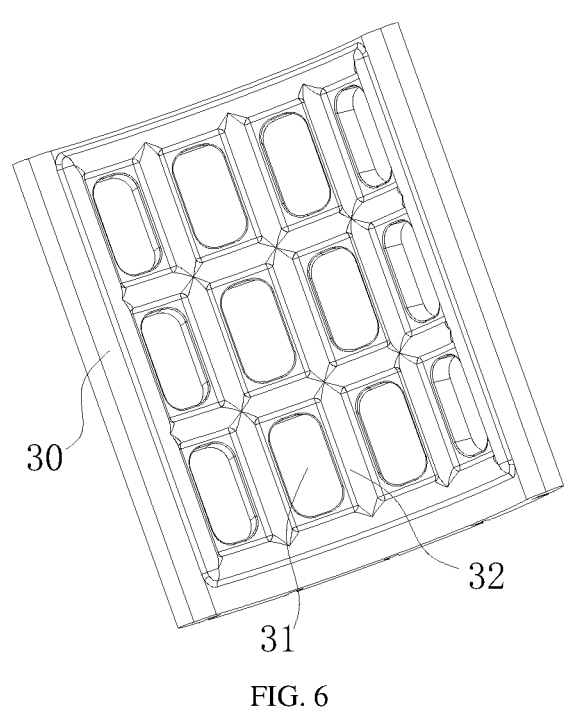

FIG. 6 is a schematic view of a sealing member of a multi-way valve according to one or more embodiments.

Figure 7:
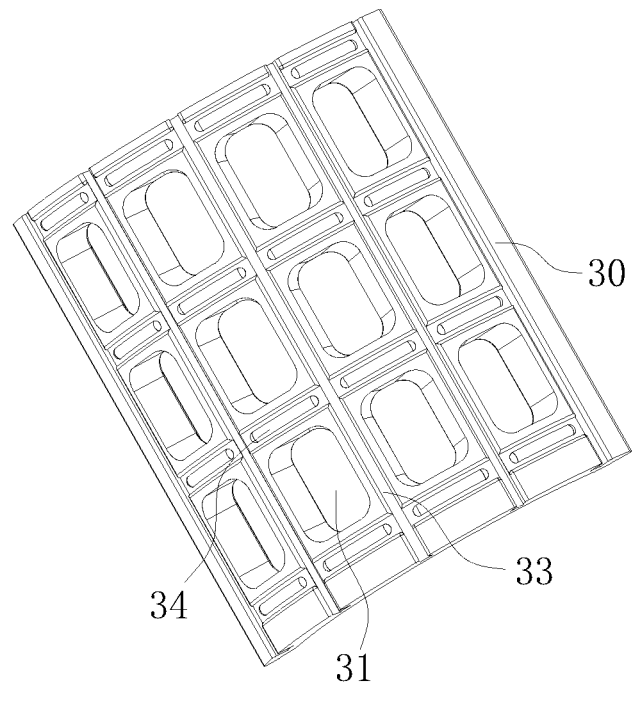

FIG. 7 is a schematic view of a sealing member of a multi-way valve in another view angle according to one or more embodiments.

Figure 8:
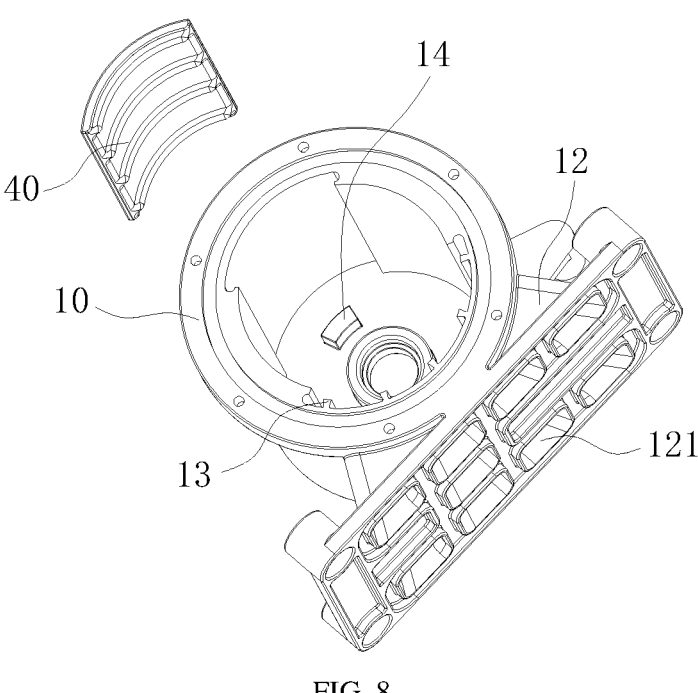

FIG. 8 is an exploded view of an assembly of a valve body and a sealing member of a multi-way valve according to one or more embodiments.

Figure 9:
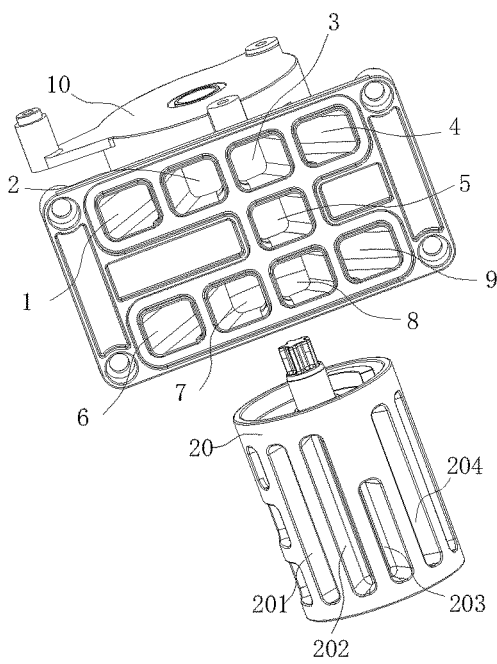

FIG. 9 is an exploded view of a valve body and a valve core when a multi-way valve is in a first working mode according to one or more embodiments.

Figure 10:
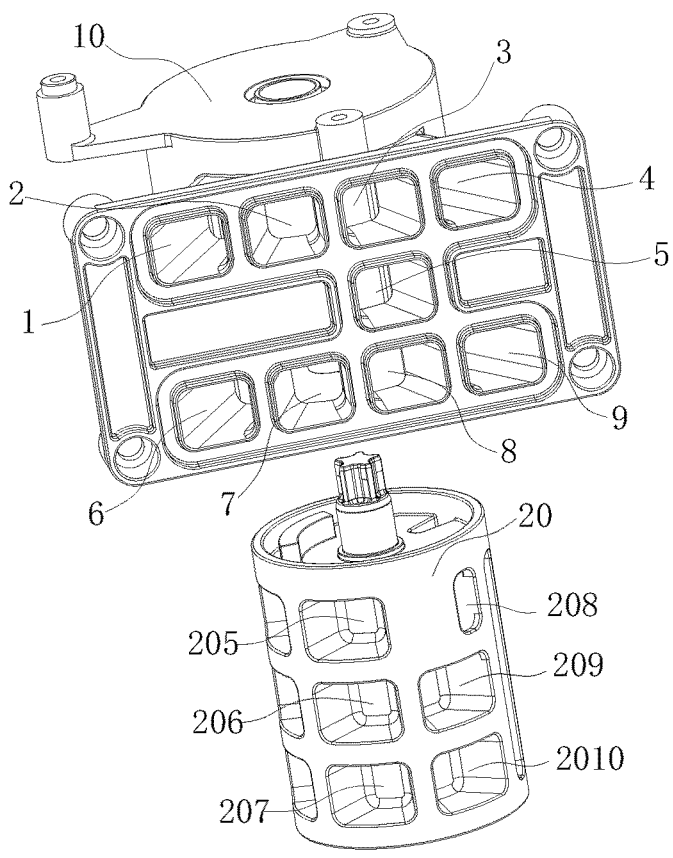

FIG. 10 is an exploded view of a valve body and a valve core of a multi-way valve when the multi-way valve is in a second working mode according to one or more embodiments.

Figure 11:
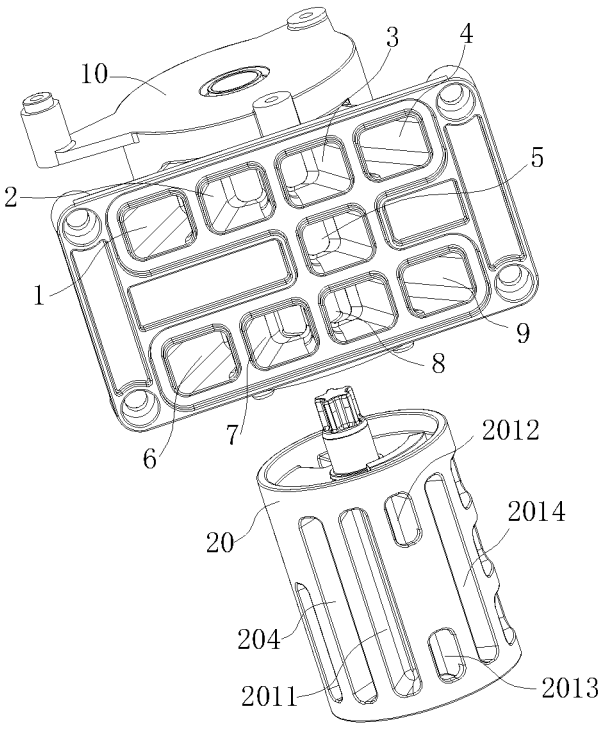

FIG. 11 is an exploded view of a valve body and a valve core of a multi-way valve when the multi-way valve is in a third working mode according to one or more embodiments.

Figure 12:
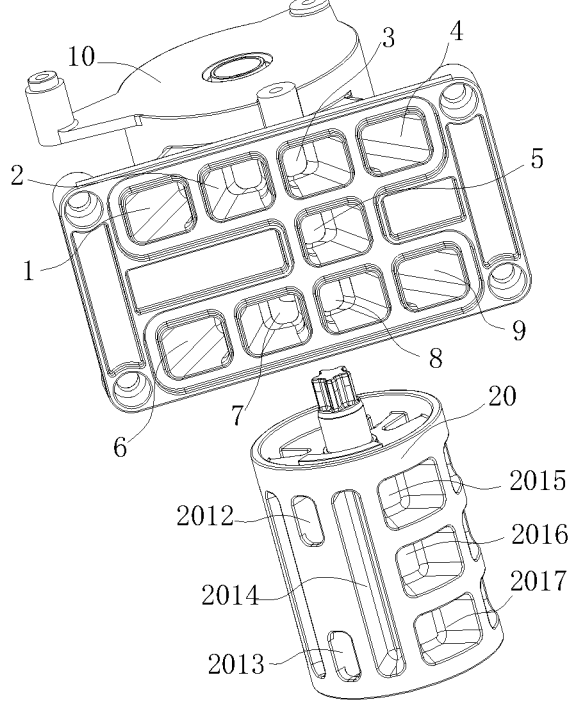

FIG. 12 is an exploded view of a valve body and a valve core of a multi-way valve when the multi-way valve is in a fourth working mode according to one or more embodiments.

Figure 13:
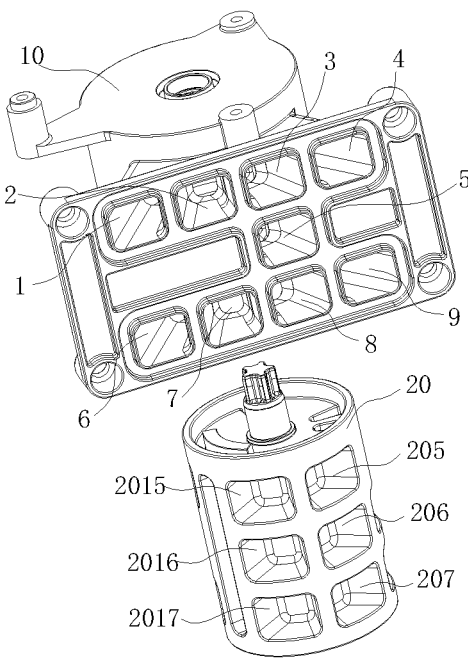

FIG. 13 is an exploded view of a valve body and a valve core of a multi-way valve when the multi-way valve is in a fifth working mode according to one or more embodiments.

Figure 14:
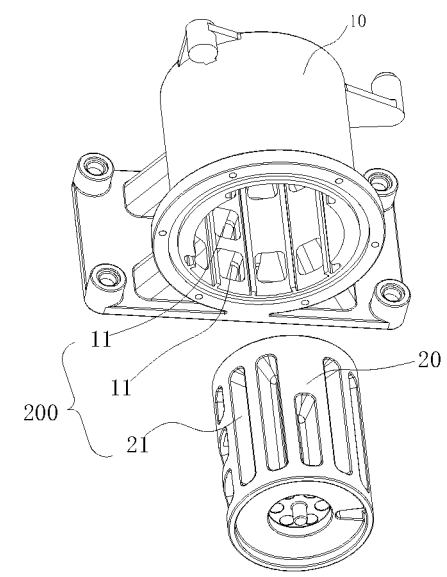

FIG. 14 is an exploded view of a valve body and a valve core of a multi-way valve according to one or more embodiments.

Figure 15:
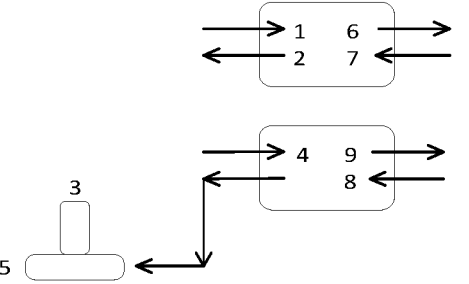

FIG. 15 is an operational schematic diagram of a multi-way valve according to one or more embodiments.

Reference signs are as follows: 100 represents a multi-way valve; 200 represents a flow passage; 10 represents a valve body; 11 represents an opening; 111 represents a first row of openings; 112 represents a second row of openings; 113 represents a third row of openings; 12 represents a first connecting convex base; 121 represents a connecting hole; 13 represents a protrusion; 14 represents a matching block; 20 represents a valve core; 21 represents a channel; 22 represents a stopping block; 30 represents a sealing member; 31 represents a through hole; 32 represents a first convex rib; 33 represents a strip-shaped groove; 34 represents a second convex rib; 40 represents a supporting plate; 41 represents an extending convex rib; 50 represents an actuator; 60 represents an end cover; 61 represents a second connecting convex base; 1 represents a first connecting hole; 2 represents a second connecting hole; 3 represents a third connecting hole; 4 represents a fourth connecting hole; 5 represents a fifth connecting hole; 6 represents a sixth connecting hole; 7 represents a seventh connecting hole; 8 represents an eighth connecting hole; 9 represents a ninth connecting hole; 201 represents a first channel; 202 represents a second channel; 203 represents a third channel; 204 represents a fourth channel; 205 represents a fifth channel; 206 represents a sixth channel; 207 represents a seventh channel; 208 represents an eighth channel; 209 represents a ninth channel; 2010 represents a tenth channel; 2011 represents an eleventh channel; 2012 represents a twelfth channel; 2013 represents a thirteenth channel; 2014 represents a fourteenth channel; 2015 represents a fifteenth channel; 2016 represents a sixteenth channel; and 2017 represents a seventeenth channel.

DETAILED DESCRIPTION

The technical scheme in the embodiment of this application will be described clearly and completely with the attached drawings. Obviously, the described embodiment is only a part of the embodiment of this application, not the whole embodiment. Based on the embodiments in this application, all other embodiments obtained by ordinary technicians in this field without creative work belong to the protection scope of this application.

It should be noted that when a component is considered to be "mounted" on another component, it can be directly on the other component or there can be a component in the middle. When a component is considered to be "set on" another component, it can be directly set on another component or there may be intervening components at the same time. When a component is considered to be "fixed" to another component, it can be directly fixed to another component or there may be intervening components at the same time.

Unless otherwise defined, all technical and scientific terms used herein have the same meaning as commonly understood by those skilled in the technical field of this application. The terminology used herein in the specification of this application is only for the purpose of describing specific embodiments, and is not intended to limit this application. As used herein, the term "or/and" includes any and all combinations of one or more related listed items.

Referring to FIG. 1 to FIG. 8 and FIG. 14, the present disclosure provides a multi-way valve 100. The multi-way valve 100 includes a valve body 10, a valve core 20 rotatably installed in the valve body 10, and a sealing member 30.

The valve body 10 is provided with a plurality of openings 11, the valve core 20 is provided with a plurality of channels 21 for matching the plurality of openings 11, and two of the plurality of openings 11 are capable of matching with corresponding one of the plurality of channels 21 to form one flow passage 200.

In this embodiments, the number of the openings 11 on the valve body 10 is nine. And nine openings 11 are capable of forming four flow passages 200 by matching with the plurality of channels 211 of the valve core 20. The four flow passages 200 of the multi-way valve 100 include at least five working modes, and the valve core 20 is capable of rotating in the valve body 10 to realize a switching of the multiple working modes.

Specifically, in this embodiment, the four flow passages 200 of the multi-way valve 100 include five working modes.

It can be understood that the multi-way valve 100 of this embodiment includes the four flow passages 200, and the four flow passages 200 include five working modes, and the four flow passages 200 can switch among various working modes according to the valve core 20 rotating in the valve body 10, and make the multi-way valve 100 integrates functions of two four-way valves and a three-way valve, so as to meet an using requirements of a system including the multi-way valve 100 for multi-fluid control. The multi-way valve 100 provided by the present disclosure has advantages of a simplified structure and a convenient installation, which makes the system with the multi-way valve 100 compact in structure and low in cost.

The nine openings 11 are disposed on the valve body 10 in three rows, i.e., a first row 111 of openings, a second row 112 of openings and a third row 113 of openings arranged in sequence. The number of the openings 11 in the first row 111 of openings and the number of the openings 11 in the third row 113 of openings are both four, the second row 112 of openings is arranged between the first row 111 of openings and the third row 113 of openings. That is,the openings 11 in the second row 112 of openings is arranged between the first row 111 of openings and the third row 113 of openings. In this way, an arrangement of the nine openings 11 of the valve body 10 can meet a requirement that the nine openings 11 of the valve body 10 cooperate with the corresponding channels 21 of the valve core 20 and form the four flow passages 200. It should be noted that along an axial direction of the valve body 10, each of the openings 11 in the three rows of the openings 11 on the valve body 10 is also arranged correspondingly in turn. And one opening 11 of the second row 112 of openings is located between the first row of openings 111 and the third row of openings 113. And "located between the first row 111 of openings and the third row 113 of openings" specifically means that the opening 11 in the second row 112 of openings is arranged between the second column and third column of the three rows of the openings.

Furthermore, the valve body 10 is further provided with a first connecting convex base 12, which is located in an area where the nine openings are arranged on the valve body 10. A side of the first connecting convex base 12 away from the valve body 10 is provided with nine connecting holes 121, the nine connecting holes 121 are in one-to-one correspondence with the nine openings 11, and the nine connecting holes 121 are respectively and correspondingly in communication with the nine openings 11. That is, the openings 11 located on the peripheral wall of the valve body 10 are extended and in communication with the connecting holes 121 located on the same plane through the first connecting convex base 12, thereby facilitating an application of the multi-way valve 100 in a system and an installation between the nine openings 11 of the valve body 10 and pipelines of the system.

In this embodiment, the sealing member 30 is arranged between the valve body 10 and the valve core 20, and it is used for connecting two of the plurality of openings 11 of the valve body 10 and corresponding one of the plurality of channels 21 of the valve core 20 and sealing a connection part between two of the plurality of openings 11 of the valve body 10 and corresponding one of the plurality of channels 21 of the valve core 20. In this way, an assembly seal between the valve core 20 and the valve body 10 can be realized, and a fluid can be prevented from leaking between the valve body 10 and the valve core 20 when the multi-way valve 100 is applied to a system and works, thus ensuring a sealing performance of the whole structure of the multi-way valve 100.

In this embodiment, the sealing member 30 can cooperate with the valve core 20 to block one of the nine openings 11 on the valve body 10, so that when the multi-way valve 100 works, the eight of the nine openings 11 of the valve body 10 can be matched with the corresponding channels 21 of the valve core 20 to form the four flow passages 200, a remaining one of the nine openings 11 is sealed by cooperation between the sealing member 30 and the valve core 20, so as to meet an using requirements of the four flow passage s 200 on the multi-way valve 100 including five working modes. It should be noted that "the valve core 20 cooperates with the sealing member 30 to seal the remaining one of the nine openings 11 of the valve body 10" specifically means that a part of the valve core 20 corresponding to the remaining opening 11 is blocked as a solid area, which will not be described here.

In this embodiment, the sealing member 30 is in an arc structure, and the sealing member 30 is provided with three rows of through holes 31 on the sealing member 30 to match the nine openings 11, each row of the three rows of through holes 31 includes four through holes 31.

In this embodiment, a first convex rib 32 is respectively provided at a peripheral position of each through hole 31 of three rows of through holes 31 and on a side surface of the sealing member 30 towards the valve core 20. The first convex rib 32 is capable of being squeezed when the sealing member 30 and the valve core 20 are matched with each other. In this way, an assembly seal between the sealing member 30 and the valve core 20 can be realized, and independence between the twelve through holes 31 of the sealing member 30 can be ensured.

Furthermore, a strip-shaped groove 33 is respectively provided on a side surface of the sealing member 30 away the valve core 20 and located on two opposite edges of each through hole 31 of the three rows of through holes 31 along an axial direction of the valve body 10. The sealing member 30 is provided with a second convex rib 34 on another two opposite edges of each of the three rows of through holes 31. The valve body 10 is provided with a protrusion 13 for matching the strip-shaped groove 33, and the sealing member 30 is capable of being installed on the valve body 10 by cooperation between the protrusion 13 and the strip-shaped groove 33, and the second convex rib 34 is capable of being squeezed when the sealing member 30 is installed on the valve body 10. In this way, an assembly connection of the sealing member 30 on the valve body 10 is realized, and assembly sealing between the sealing member 30 and the valve body 10 is ensured, so as to ensure independence among the nine openings 11 of the valve body 10. It should be noted that the sealing member 30 in this embodiment is a rubber member, and a Teflon coating can be further formed on a surface of the rubber member by spraying or vulcanizing to reduce a frictional resistance from the sealing member 30 when the valve core 20 rotates relative to the sealing member 30.

It should be noted that in this embodiment, the two edges of the through hole 31 of the sealing member 30 refer to two sides of an opening of each through hole 31 on a side surface of the sealing member 30 towards the valve body 10.

In an embodiment, the multi-way valve 100 includes a supporting plate 40, the support plate 40 is inserted into the valve body 10, a surface of the support plate 40 towards the sealing member 30 is provided with an extending convex rib 41, and the supporting plate 40 is capable of abutting against the valve core 20 through the extending convex rib 41, to make an axis of the valve core 20 and a rotation axis of the valve core 20 on the same straight line. That is, the axis of the valve core 20 coincides with the rotation axis of the valve core 20. In an embodiment, the supporting plate 40 can be provided with four extending convex ribs 41, each of the extending convex ribs 41 is respectively arranged corresponding to the channels 21 in three rows of the valve core 20. In this way, the valve core 20 is prevented from being skewed when the valve core 20 is subjected to a reaction force of the sealing member 30, and furthermore, an internal leakage of the multi-way valve 100 and a decrease of the sealing performance of the multi-way valve 100 caused by a tilting of the valve core 20 are avoided. Thereby, it can be ensured that the valve core 20 switches five working modes of the multi-way valve 100 when rotating in the valve body 10, further improving a working stability of the multi-way valve 100. At the same time, a contact area between the supporting plate 40 and the valve core 20 can be reduced when the extending convex ribs 41 abut against the valve core 20, thus reducing a frictional resistance of the valve core 20 when it rotates. It should be noted that a friction coefficient of the supporting plate 40 of the multi-way valve 100 is less than that of the valve body 10. The supporting plate 40 can be made of plastic materials such as PTFE (Polytetrafluoroethylene) or PVDF (Polyvinylidene difluoride), so as to reduce a friction force when the valve core 20 rotates relative to the valve body 10.

In this embodiment, a stopping block 22 is disposed on a surface of the valve core 20, a matching block 14 matched with the stopping block 22 is disposed on the valve body 10, and the stopping block 22 is capable of locating an initial position of the valve core 20 in the valve body 10 by cooperating with the matching block 14. In this way, an angle at which the valve core 20 rotates in the valve body 10 can be conveniently controlled, so that a working mode of the multi-way valve 100 can be easily controlled, thereby ensuring that switching of the five working modes of the multi-way valve 100 can be implemented by controlling different rotation angles of the valve core 20 when the multi-way valve 100 works. It should be noted that switching of the five working modes when the multi-way valve 100 works may be specifically implemented by driving the valve core 20 to rotate different angles based on an initial positioning of the valve core 20 in the valve body 10, details are not described herein.

To facilitate description of the five working modes of the four flow passages 200 in the multi-way valve 100, the nine connecting holes 121 of the first connecting convex base 12 of the valve body 10 in this embodiment is respectively defined as a first connecting hole 1, a second connecting hole 2, a third connecting hole 3, a fourth connecting hole 4, a fifth connecting hole 5, a sixth connecting hole 6, a seventh connecting hole 7, an eighth connecting hole 8, and a ninth connecting hole 9. The sealing member 30 is disposed between the valve body 10 and the valve core 20, a connection relationship between the nine connecting holes 121 of the valve body 10 of the multi-way valve 100 and a corresponding channel 21 of the valve core 20 is clearly described by the four flow passages 200 of the multi-way valve 100 being formed by connecting which one of eight connecting holes 121 to corresponding one of the channels 21 of the valve body 10. Referring to FIG. 15, the multi-way valve 100 integrates the functions of two four-way valves and a three-way valve to meet the needs of the application of a system including the multi-way valve 100 for multi-fluid control.

Referring to FIG. 9, when the multi-way valve 100 in the present disclosure is in a first working mode, the first connecting hole 1 of the valve body 10 is in communication with the sixth connecting hole 6 by the first channel 201 of the valve core 20 to form one flow passage, the second connecting hole 2 is in communication with the seventh connecting hole 7 by the second channel 202 of the valve core 20 to form another flow passage, the fifth connecting hole 5 is in communication with the eighth connecting hole 8 by the third channel 203 of the valve core 20 to form another flow passage, the fourth connecting hole 4 is in communication with the ninth connecting hole 9 by the fourth channel 204 of the valve core 20 to form another flow passage, and the third connecting hole 3 is sealed by cooperation between the valve core 20 and the sealing member 30. It should be noted that all of the first channel 201, the second channel 202, the third channel 203, and the fourth channel 204 are disposed axially, the first channel 201, the second channel 202, and the fourth channel 204 can be in communication with three through holes 31 in one row of through holes 31 of the sealing member 30 at the same time, and the third channel 203 can be in communication with two through holes 31 in one row of through holes 31 of the sealing member 30 at the same time.

Referring to FIG. 10, when the multi-way valve 100 in the present disclosure is in a second working mode, the first connecting hole 1 and the second connecting hole 2 of the valve body 10 are in communication with form one flow passage by the fifth channel 205 of the valve core 20, the fourth connecting hole 4 and the fifth connecting hole 5 are in communication with form another flow passage by the eighth channel 208 the ninth channel 209 interconnected with each other, the sixth connecting hole 6 and the seventh connecting hole 7 are in communication with form another flow passage by the seventh channel 207 of the valve core 20, the eighth connecting hole 8 and the ninth connecting hole 9 are in communication with form another flow passage by the tenth channel 2010, and the third connecting hole 3 is sealed by cooperation between the valve core 20 and the sealing member 30. It should be noted that both the fifth channel 205, the seventh channel 207, the ninth channel 209, and the tenth channel 2010 in this embodiment are disposed horizontally, and the fifth channel 205, the seventh channel 207, the ninth channel 209, and the tenth channel 2010 can be in communication with two adjacent through holes 31 in a row of the sealing member 30 simultaneously, and the eighth channel 208 can only act on one through hole 31 of the sealing member 30, and the eighth channel 208 and the ninth channel 209 are in communication with each other.

Referring to FIG. 11, when the multi-way valve 100 in the present disclosure is in a third working mode, the first connecting hole 1 of the valve body 10 is in communication with the sixth connecting hole 6 by the fourth channel 204 of the valve core 20 to form one flow passage, the second connecting hole 2 is in communication with the seventh connecting hole 7 by the eleventh channel 2011 of the valve core 20 to form another flow passage, the third connecting hole 3 is in communication with the eighth connecting hole 8 by the twelfth channel 2012 and the thirteenth channel 2013 of the valve core 20 interconnected with each other to form another flow passage, the fourth connecting hole 4 is in communication with the ninth connecting hole 9 by the fourteenth channel 2014 of the valve core 20 to form another flow passage, and the fifth connecting hole 5 is sealed by cooperation between the valve core 20 and the sealing member 30. It should be noted that both the eleventh channel 2011 and the fourteenth channel 2014 in this embodiment are disposed axially, and the eleventh channel 2011 and the fourteenth channel 2014 can be in communication with three through holes 31 in one row of the sealing member 30 at the same time. However, the twelfth channel 2012 and the thirteenth channel 2013 can be separately in communication with one corresponding through hole 31 in a same row of the sealing member 30, and the twelfth channel 2012 and the thirteenth channel 2013 are in communication with each other.

Referring to FIG. 12, when the multi-way valve 100 in the present disclosure is in a fourth working mode, the first connecting hole 1 of the valve body 10 is in communication with the sixth connecting hole 6 by between the twelfth channel 2012 and the thirteenth channel 2013 interconnected with each other to form one flow passage, the second connecting hole 2 and the seventh connecting hole 7 are connected by the fourteenth channel 2014 of the valve core 20 to form another flow passage, the third connecting hole 3 and the fourth connecting hole 4 are connected by the fifteenth channel 2015 of the valve core 20 to form another flow passage, the eighth connecting hole 8 and the ninth connecting hole 9 are connected by the seventeenth channel 2017 of the valve core 20 to form another flow passage, the fifth connecting hole 5 is blocked by only the sixteenth channel 2016 of the valve core 20. It should be noted that both the fifteenth channel 2015, the sixteenth channel 2016, and the seventeenth channel 2017 in this embodiment are disposed horizontally, and the fifteenth channel 2015, the sixteenth channel 2016, and the seventeenth channel 2017 can be in communication with two adjacent through holes 31 in one row of through holes of the sealing member 30 at the same time.

Referring to FIG. 13, when the multi-way valve 100 in the present disclosure is in a fifth working mode, the first connecting hole 1 on the valve body 10 is in communication with the second connecting hole 2 by the fifteenth channel 2015 of the valve core 20 to form one flow passage, the third connecting hole 3 is in communication with the fourth connecting hole 4 by the fifth channel 205 of the valve core 20 to form another flow passage, the sixth connecting hole 6 is in communication with the seventh connecting hole 7 by the seventeenth channel 2017 of the valve core 20 to form another flow passage, the eighth connecting hole 8 is in communication with the ninth connecting hole 9 by the seventh channel 207 of the valve core 20 to form another flow passage, and the fifth connecting hole 5 is blocked because only the sixth channel 206 on the valve core 20 is connected.

Furthermore, it should be noted that the multi-way valve 100 in the present disclosure further includes an actuator 50 and an end cover 60, and the end cover 60 is covered on the valve body 10, so as to limit and install the valve core 20 in the valve body 10. The actuator 50 is connected to the valve core 20, when the multi-way valve 100 works, the actuator 50 can drive the valve core 20 to rotate relative to the valve body 10, so as to meet a requirement for switching five working modes.

In this embodiment, a second connecting convex base 61 is disposed on a side surface of the end cover 60 toward the valve core 20, and the valve core 20 is rotatably disposed on the second connecting convex base 61 of the end cover 60. The valve core 20 can be specifically rotatably connected to the second connecting convex base 61 by a bearing (not shown), so that when the actuator 50 drives the valve core 20 to rotate relative to the valve body 10, the valve core 20 can rotate on the second connecting convex base 61 of the end cover 60, thus the valve core 20 rotates on the end cover 60.

It should be noted that, in this embodiment, both an arrangement manner of the the connecting holes of the valve body 10 and an arrangement manner of the channels of the valve core 20 match the five working modes of the multi-way valve 100. In the present disclosure, a position relationship and a structure arranging manner of each component in the accompanying drawings are used to match the five working modes of the multi-way valve 100. If the working mode of the multi-way valve 100 changes, arrangements of the connecting holes of the valve body 10 and the channels of the valve core 20 also need to be adapted.

The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the present disclosure.

One of ordinary skill in the art should recognize that the above embodiments are used only to illustrate the present disclosure and are not used to limit the present disclosure, and that appropriate variations and improvements to the above embodiments fall within the protection scope of the present disclosure so long as they are made without departing from the substantial spirit of the present disclosure.

What is claimed is:

1. A multi-way valve, comprising a valve body and a valve core rotatably installed in the valve body, wherein the valve body is provided with a plurality of openings, the valve core is provided with a plurality of channels for matching with the plurality of openings, and two of the plurality of openings are capable of matching with corresponding one of the plurality of channels to form one flow passage;

wherein the number of the plurality of openings is nine, and nine openings are capable of forming four flow passages by matching with the plurality of channels; the four flow passages of the multi-way valve comprise at least five working modes, and the valve core is capable of rotating in the valve body to realize a switching of the multiple working modes;

the nine openings are disposed on the valve body in three rows, i.e., a first row of openings, a second row of openings and a third row of openings arranged in sequence, and the second row of openings are located between the first row of openings and the third row of openings.

2. The multi-way valve of claim 1, wherein the number of the openings in the first row of openings and the number of the openings in the third row of openings are both four.

3. The multi-way valve of claim 2, wherein the valve body is further provided with a first connecting convex base, which is located in an area where the nine openings are arranged on the valve body; a side of the first connecting convex base away from the valve body is provided with nine connecting holes, the nine connecting holes are in one-to-one correspondence with the nine openings, and the nine connecting holes are respectively and correspondingly in communication with the nine openings.

4. The multi-way valve of claim 2, further comprising a sealing member, wherein the sealing member is arranged between the valve body and the valve core and is configured for connecting two of the plurality of openings of the valve body and corresponding one of the plurality of channels of the valve core and sealing a connection part between two of the plurality of openings of the valve body and corresponding one of the plurality of channels of the valve core.

5. The multi-way valve of claim 4, wherein the sealing member is capable of matching with the valve core to block a remaining one of the plurality of openings of the valve body.

6. The multi-way valve of claim 5, wherein the sealing member is in an arc structure, and the sealing member is provided with three rows of through holes on the sealing member to match the nine openings, and each of the three rows of through holes comprises four through holes.

7. The multi-way valve of claim 6, wherein a first convex rib is respectively provided at a peripheral position of each through hole of three rows of through holes and on a side surface of the sealing member towards the valve core, and the first convex rib is capable of being squeezed when the sealing member and the valve core are matched with each other.

8. The multi-way valve of claim 6, wherein a strip-shaped groove is respectively provided on a side surface of the sealing member away the valve core and located on two opposite edges of each through hole of the three rows of through holes along an axial direction of the valve body, and the sealing member is provided with a second convex rib on another two opposite edges of each of three rows of through holes, the valve body is provided with a protrusion for matching the strip-shaped groove, and the sealing member is capable of being installed on the valve body by cooperation between the protrusion and the strip-shaped groove, and the second convex rib is capable of being squeezed when the sealing member is installed on the valve body.

9. The multi-way valve of claim 4, further comprising a supporting plate, wherein the support plate is inserted into the valve body, a surface of the support plate towards the sealing member is provided with an extending convex rib, and the supporting plate is capable of abutting against the valve core through the extending convex rib, to make an axis of the valve core and a rotation axis of the valve core on the same straight line.

10. The multi-way valve of claim 1, wherein the valve core is provided with a stopping block, the valve body is provided with a matching block for matching the stopping block, and the stopping block is capable of locating an initial position of the valve core in the valve body by cooperating with the matching block.

\* \* \* \* \*